Dec. 2, 1952 A. RESTIVO 2,620,251
INDUSTRIAL CABINET
Filed Dec. 22, 1950 5 Sheets-Sheet 1
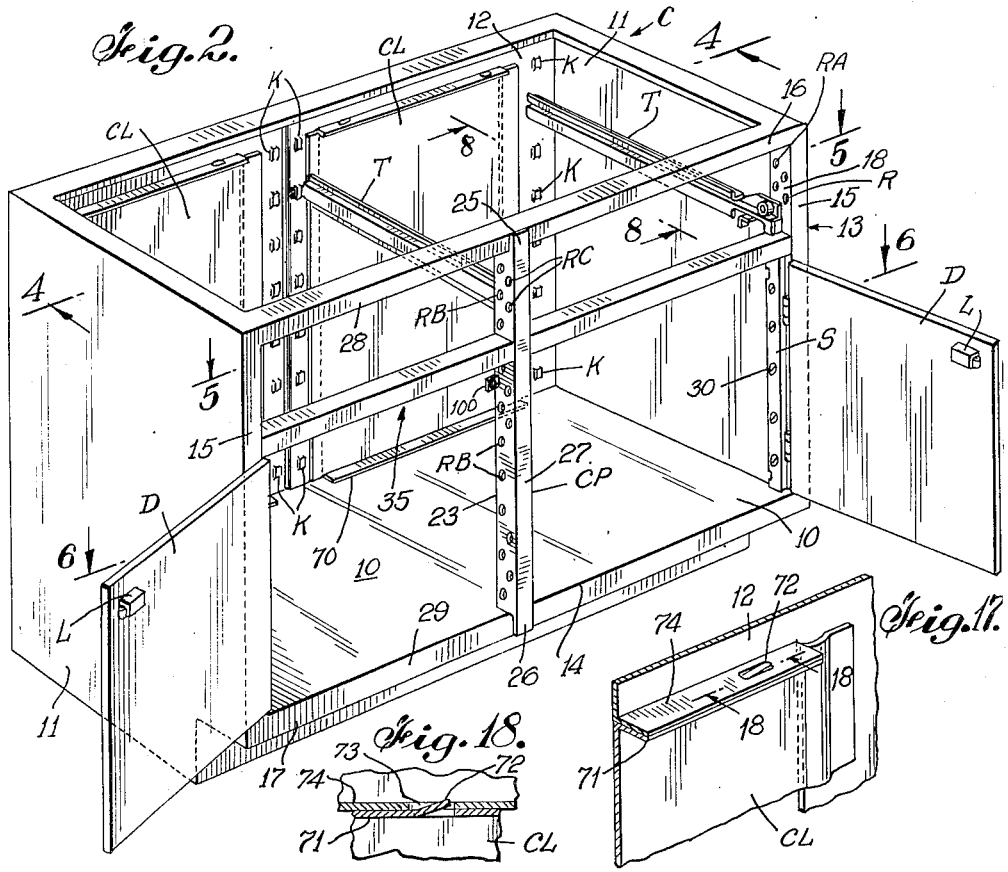
   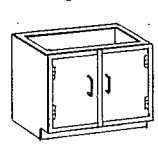 
    
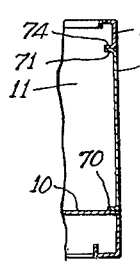
INVENTOR
ANGELO RESTIVO
BY
Palmer
ATTORNEY Dec. 2, 1952 A. RESTIVO 2,620,251
INDUSTRIAL CABINET
Filed Dec. 22, 1950 5 Sheets-Sheet 2

INVENTOR
ANGELO RESTIVO
BY
ATTORNEY

Dec. 2, 1952          A. RESTIVO          2,620,251
INDUSTRIAL CABINET
Filed Dec. 22, 1950          5 Sheets-Sheet 3
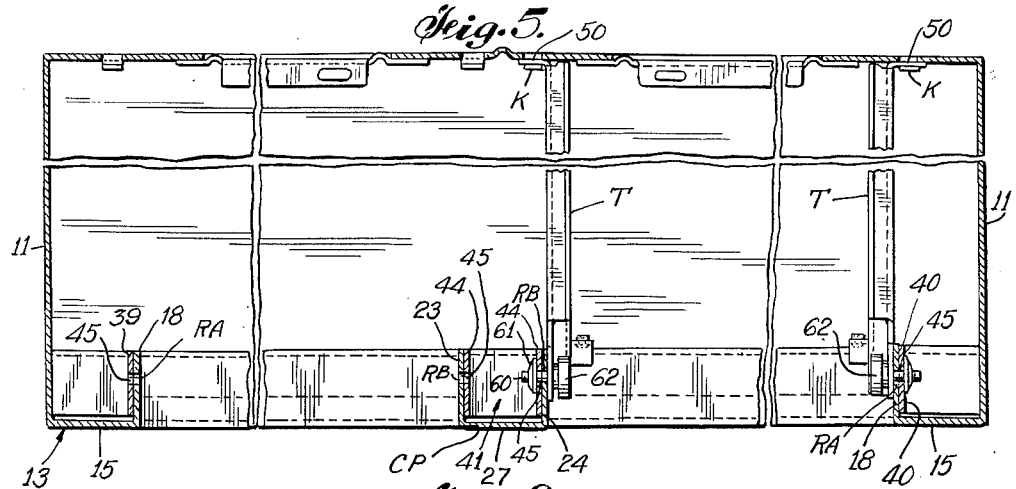
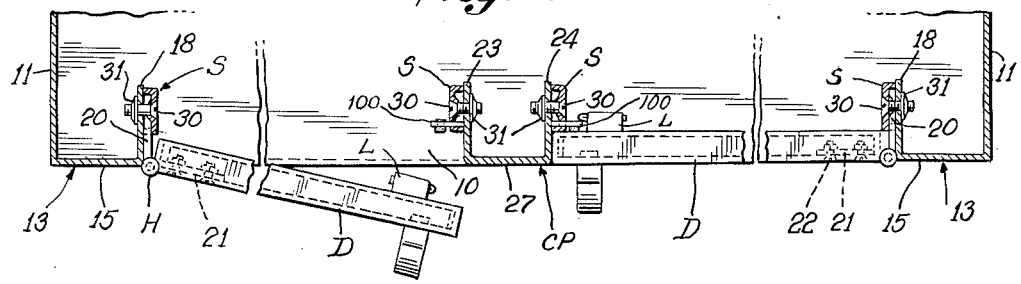
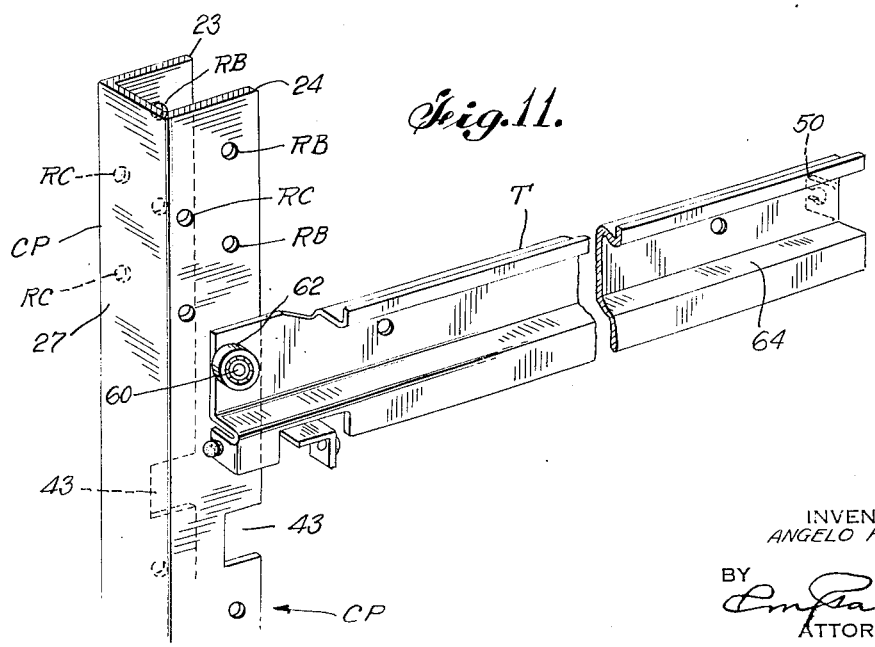
INVENTOR
ANGELO RESTIVO
BY
ATTORNEY

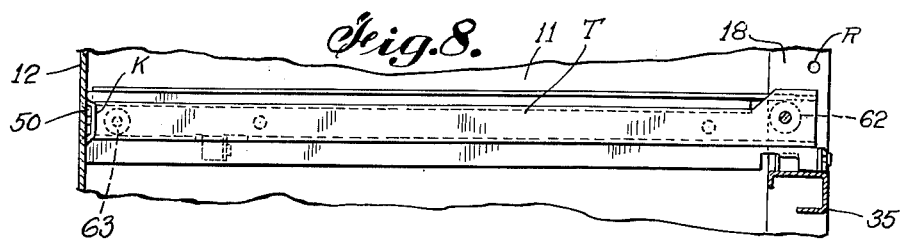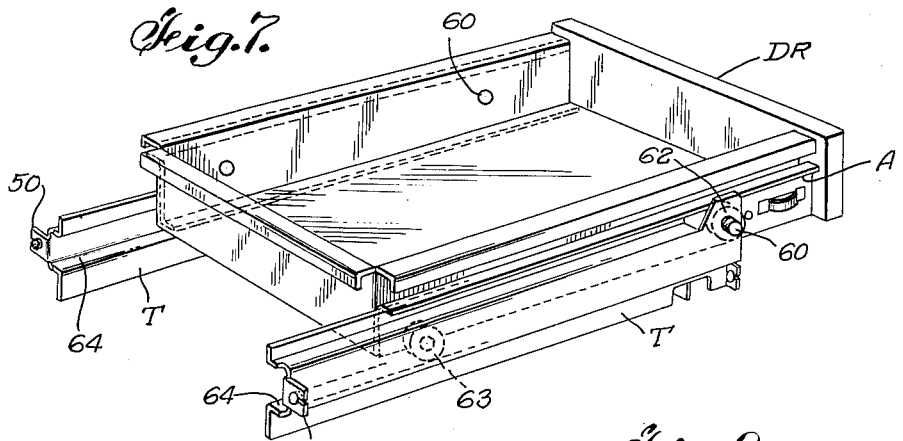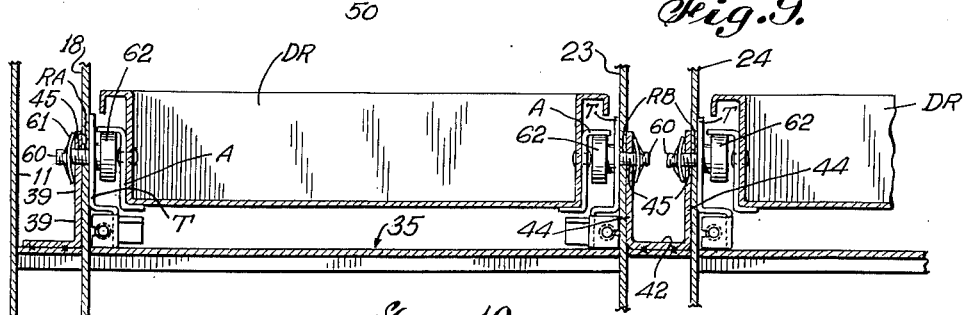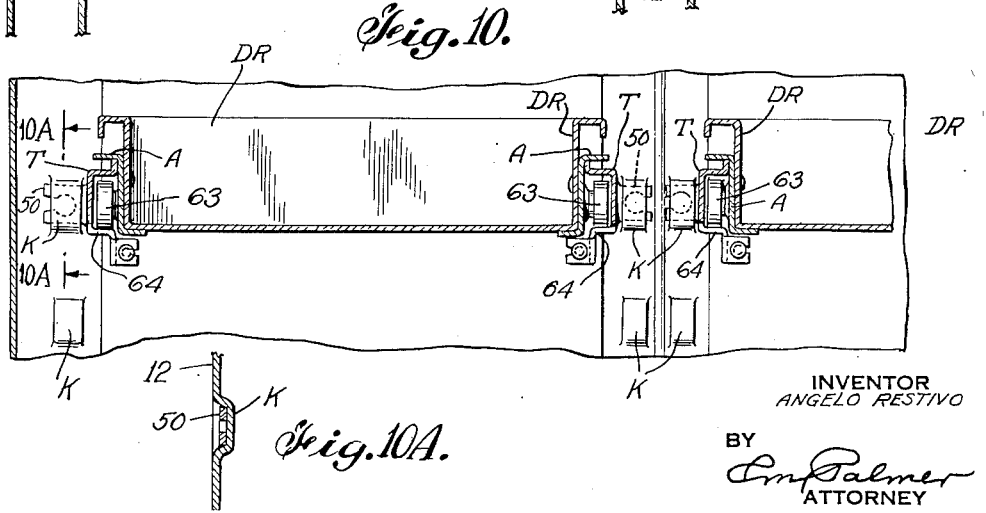

Dec. 2, 1952 A. RESTIVO 2,620,251
INDUSTRIAL CABINET
Filed Dec. 22, 1950 5 Sheets-Sheet 5
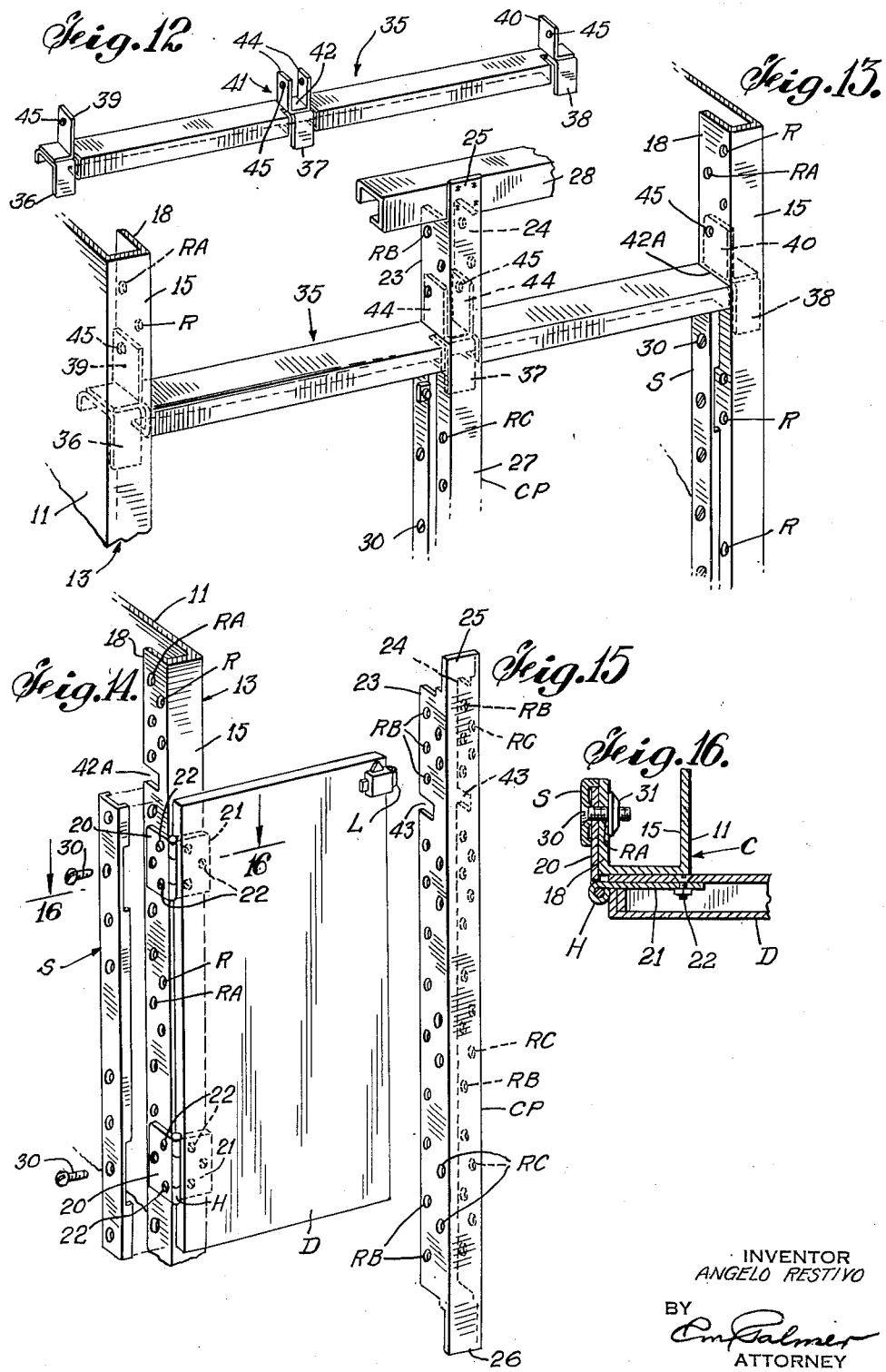
INVENTOR
ANGELO RESTIVO
BY
ATTORNEY Patented Dec. 2, 1952

2,620,251

UNITED STATES PATENT OFFICE 2,620,251

INDUSTRIAL CABINET

Angelo Restivo, Jamaica, N. Y., assignor to Laboratory Furniture Company, Inc., Long Island City, N. Y., a corporation of New York Application December 22, 1950, Serial No. 202,241

3 Claims. (Cl. 312—240)

The present invention is directed to an improved cabinet and its dominating object is realized in the provision of novel means to permit prompt conversion of the cabinet in respect to door and/or drawer combinations to suit the particular requirements of the consumer and by the latter. As a further object the invention comprehends the interchange of swinging doors in place of slidable drawers and vice versa. Another object resides in the provision of means to allow convenient substitution of many slidable drawers in place of a single slidable drawer and vice versa. Another object deals with means to permit mounting of a large swinging door to replace a smaller door and vice versa. Another special object resides in the provision of transversely arranged and spaced flanges having rows of perforations arranged in staggered relation for adequate reception of removable fastening means to effectively secure the swinging door and tracks for the slidable drawers to the cabinet. Another important object is concerned with the provision of an intermediate reach for the cabinet removably nested therein and also removably associated with the middle vertical column or support dividing the front opening of the cabinet. A further object is to provide rows or perforations in the transversely arranged and spaced wings of the middle post in a staggered spaced row of perforations and in the transversely arranged and spaced wings of the middle post also in a staggered relation, however in horizontal alignment with the transversely arranged staggered perforations of the flanges constituting the sides of the front opening of the cabinet. Another important object is to provide effective means for disconnectably sustaining the rear ends of the track means for the slidable drawers. Other important objects and functional and structural features of the invention will appear from the following detailed specification considered in connection with the accompanying drawings wherein:

Fig. 1 is a perspective view of an industrial cabinet according to one embodiment of my invention, however on a small scale.

Fig. 2 is an enlarged perspective view of Fig. 1, illustrating the doors opened, the drawers removed, and also the spaced stops for the center post removed.

Fig. 4A is a transverse sectional view on the line 4A—4A of Fig. 4.

Fig. 5 is a horizontal broken sectional view on the line 5—5 of Fig. 2.

Fig. 6 is a horizontal sectional view on the line 6—6 of Fig. 2 but illustrating one of the doors partly opened and the other closed.

Fig. 7 is a perspective view of one of the drawers slidably mounted on a pair of tracks.

Fig. 8 is a transverse sectional view taken on the line 8—8 of Fig. 2.

Fig. 9 is a vertical sectional view on line 9—9 of Fig. 1.

Fig. 10 is a vertical sectional view on the line 10—10 of Fig. 1.

Fig. 10A is a sectional view on the line 10A—10A of Fig. 10, showing one of the retaining keepers of the cabinet.

Fig. 11 is a perspective and fragmentary view of the middle column or post and one of the drawer guide tracks removably carried thereby.

Fig. 12 is a perspective view of the removable brace or intermediate reach.

Fig. 13 is a fragmentary perspective view showing the relation of the removable reach nested within the cabinet.

Fig. 14 is a fragmentary perspective view showing one of the doors hung on the cabinet and the companion stop therefor disconnected therefrom.

Fig. 15 is a perspective view of the middle column, exhibiting the staggered relation of the apertures or perforations in the spaced rows of openings in the spaced sides or wings thereof.

Fig. 16 is a sectional view on the line 16—16 of Fig. 4, but with the companion door stop secured to the cabinet.

Fig. 17 is a fragmentary view of the rear wall and its removable back closure.

Fig. 18 is a sectional view on the line 18—18 of Fig. 17.

Fig. 19 shows a modification of Fig. 1 and illustrates the substitution of two drawers in place of one.

Fig. 20 is a view similar to Fig. 19 but with one door slightly smaller and below three shallow drawers.

Fig. 21 shows a modified cabinet wherein two doors occupy the openings on both sides of the column.

Fig. 22 is a view similar to Fig. 19 but with a shorter middle column and a single slidable drawer thereabove.

Figure 3:
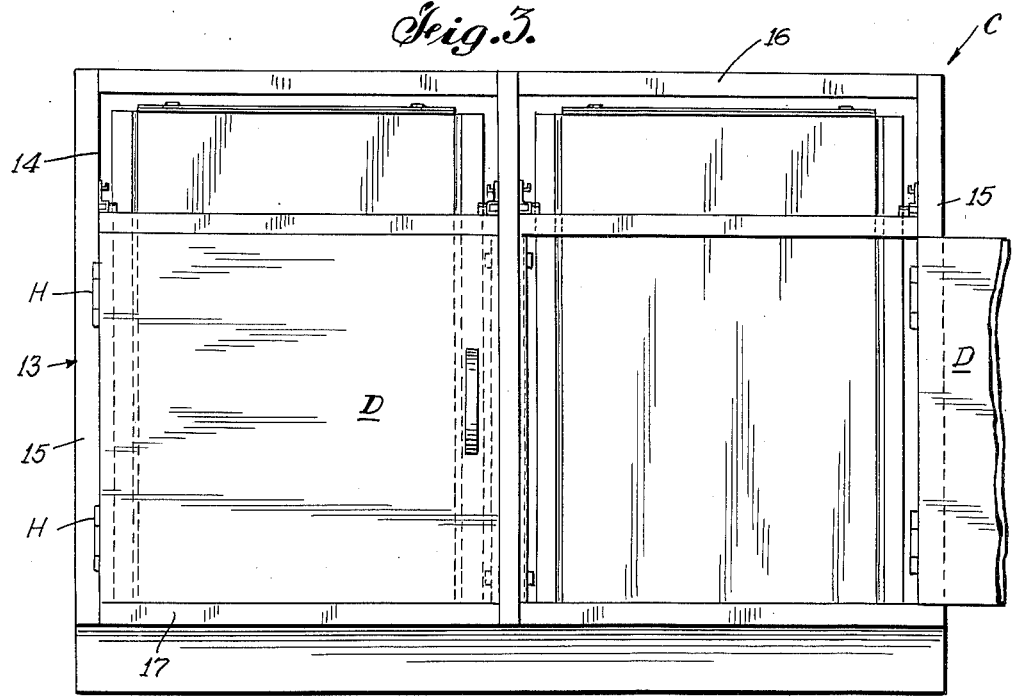
Fig. 3 is a front elevational view of Fig. 2 depicting one door closed and the other opened.

Figs. 23 to 26 inclusive show further conversions of Fig. 1 which are possible in the matter of replacing doors by drawers and vice versa and in respect to the substitution of smaller or even larger drawers, and Fig. 27 is a modified view of Fig. 21, depicting the swinging doors hinged to the middle column or post.

The industrial cabinet C is preferably of sheet metal and is characterized by bottom wall 10, side walls 11, back wall 12, and the front wall generally designated 13 constituting a vertical rim forming opening 14 (Fig. 2) more particularly defined by side margins 15 and upper and lower margins 16 and 17.

Integral with and extending rearwardly from side margins 15 are the flanges 18 each of which includes two rows of openings R and RA, the openings of one row being staggered in respect to the openings of the other row.

Leaves 20 and 21 of hinges H are removably secured to flanges 18 and to doors D by screws 22 to permit swinging of the latter relative to the cabinet.

Center post or column CP is utilized to divide the front opening 14 of the cabinet. This post is U shaped having the side wings or flanges 23 and 24 provided with a pair of rear and front rows of perforations or openings RB and RC arranged in staggered relation however in alignment respectively with rear and front rows of perforations or apertures RA and R of the inwardly turned spaced flanges 18. This center post has its upper and lower portions 25 and 26 which project from web 27 welded to the upper and lower front horizontal margins 28 and 29 of the cabinet although flanges 23 and 24 thereof are seated on flooring or bottom wall 10 and are coextensive with the height of opening 14 to divide the latter.

Stops S in the form of U-shaped members are fastened to the spaced flanges 18 and to the sides or wings 23 and 24 of the center post CP by screws 30 and nuts 32, the screws however passing through the rear perforations RA in flanges 18 and in rear apertures RB of wings 23 and 24 to arrange stops S rearwardly of the front wall of the cabinet.

Preferably removably mounted on flanges 18 and center post CP is the intermediate horizontal reach or brace 35 characterized by the depending lips 36, 37 and 38 and the upstanding lugs 39 and 40. A yoke 41 has its web 42 welded to reach 35. Flanges 18 are interrupted by rectangular horizontally aligned notches as 42A and sides or wings 23 and 24 of post CP include the aligned notches 43. All of these notches are in alignment for receiving reach 35 to present end lips 36 and 38 adjacent inner faces of the front margins 15 of the cabinet and the upstanding lugs 39 and 40 in straddling relation to flanges 18 (Fig. 13). By this action upstanding ears 44 of yoke 41 are arranged or nested within post CP to be closely straddled by wings 23 and 24. Lugs 39 and 40 and ears 44 each has an opening as 45 adapted to register with an opening in one of the rear rows of openings RA in flanges 18 and in rear openings RB in the spaced wings 23 and 24 (Fig. 5).

Figure 4:
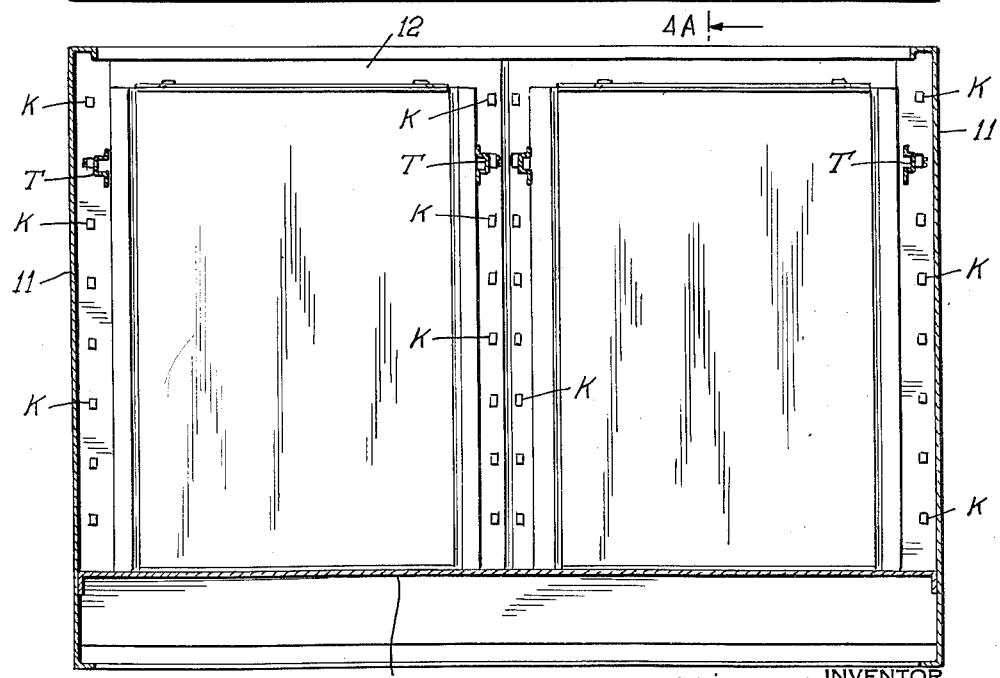
Fig. 4 is a sectional view on the line 4—4 of Fig. 2.

Tracks T for the slidable drawers DR are each provided with split and right angularly arranged tongue 50 at their rear ends for reception in a keeper K (Fig. 10A) struck out of back wall 12 which includes four vertical rows of spaced keepers K (Fig. 4).

A pair of rails T are employed to slidably sustain a drawer DR. However the rails are removably secured to flanges 18 and to wings 23 and 24 of center post CP by roller carrying threaded bolts as 60 (Figs. 5 and 9) passing through one of the rear openings RA and the aligned opening 45 of an associated lug 39 of reach 35 as in the case of flanges 18 and the rear openings RB of wings 23 and 24 in the case of the center post and associated aligned openings 45 of lugs 44 of yoke 41. A spring nut 61 is utilized to hold tracks T to flanges 18 and also to the center post.

Rollers 62 support the angle members A appropriately secured to the sides of a drawer DR. These angle members A each effectively carries a roller 63 removably seated in a horizontal guide channel 64 of a companion track T. By the arrangement disclosed it is apparent that tracks T may be quickly detached from within cabinet. This is accomplished in first withdrawing the drawers from the cabinet. Subsequently, spring nuts 61 are removed. Thereafter a lateral thrust on the track permits withdrawal of associated screw as 60 to be independent of the cabinet and its tongue 50 from its keeper K.

In other words tracks T mounted on column CP or on flanges 18, may be readily detached therefrom and conversely may be quickly attached thereto and of course in the selected keepers K on rear wall 12. It should also be realized that the screw and bolt means 60 and 61 also secure the middle reach 35 in place across the middle post CP and to flanges 18, thus assuring that reach 35 is in a set and nested position.

With the present arrangement and by reason of the staggered perforations in flanges 18 and in the spaced wings of the center post, various combinations of drawer and door assemblies are possible, for example, in Fig. 19 two shallow drawers can replace one deep drawer of Fig. 1. Or in Fig. 20 three smaller drawers may be effectively sustained above a smaller swinging door. In Fig. 21, the cabinet can carry two swinging doors as the intermediate reach has been removed. In Fig. 22, the center post is of less height above which is a single wide drawer. In Fig. 23, the intermediate reach is removed to permit all drawers on one side of the center post and one swinging door on the other side. In Fig. 24, all drawers are on one side and a swinging door on the other. In Fig. 25, the intermediate reach has been detached to associate all drawers on both sides of the middle post. In Fig. 26 deeper drawers are shown on both sides of the center post, and in Fig. 27, the doors may be hung from the center post. If desired spring type latches as L in cooperation with retaining lugs 100 are utilized to hold doors D closed against the removable stops S.

Further in accordance with the invention, back wall 13 embodies two removable closures CL each of which has the lower lug 70 seated on the bottom wall 10 and an upper lug 71 having a tooth 72 adapted to be snapped into opening 73 of overhanging flange 74 of wall 12. This tooth may be readily bent out of opening 73 thus unlocking closure CL to permit its movement away from back wall 12 to provide access to the interior of the cabinet.

Various changes may be made in details of construction and arrangement of parts without departing from the spirit of the invention or sacrificing any of the advantages thereof inherent therein.

I claim:

1. A cabinet adapted to interchangeably utilize swingable doors of one height in place of doors of a different height, comprising; front and rear walls, spaced side walls interconnecting said front and rear walls, said front wall having a rim defining an opening and including flange means constituting spaced sides of said opening and disposed within said cabinet and substantially parallel to and spaced from said side walls, each of said flange means including a pair of horizontally spaced front and rear vertically arranged rows of perforations disposed in staggered relation, a post secured to said rim and dividing said opening, said post having transversely arranged and spaced wings each embodying a pair of horizontally spaced front and rear rows of apertures disposed in staggered relation but in horizontal alignment with said rows of perforations, stop means, tightening means in part passing through said stop means and several aligned perforations and apertures of said rear rows for securing said stop means to said flange means and to said wings, hinge means carried by said doors, and fastening means in part passing through several of said perforations of said front rows for securing said hinge means to said flange means.

2. A cabinet adapted to interchangeably utilize swingable doors of one height in place of doors of a different height, comprising; front and rear walls, spaced side walls interconnecting said front and rear walls, said front wall having a rim defining an opening and including transversely arranged and spaced flange means constituting spaced sides of said opening and disposed within said cabinet and substantially parallel to and spaced from said side walls, each of said flange means including a pair of horizontally spaced front and rear vertically arranged rows of perforations disposed in staggered relation, a vertically arranged channel shaped post secured to said rim and dividing said opening, said post having transversely arranged and rearwardly extending spaced wings each embodying a pair of horizontally spaced and front and rear rows of apertures disposed in staggered relation but in horizontal alignment with said rows of perforations, spaced channel shaped stop means disposed within said opening and against said flange means, clamping means in part passing through said stop means and several perforations of said rear rows for securing said stop means to said flange means, spaced channel shaped stop means disposed against said wings, clamping means in part passing through said last mentioned stop means and several apertures of said rear rows for securing said last mentioned stop means to said wings, hinge means carried by said doors and interposed between said flange means and said first mentioned stop means, and fastening means in part passing through said hinge means and several perforations of said front rows for securing said hinge means to said flange means.

3. A cabinet comprising front and rear walls, spaced side walls interconnecting said front and rear walls, said front wall having a rim defining an opening and including rearwardly extending flange means constituting spaced vertical sides of said opening and disposed within and transversely of said cabinet and substantially parallel to and spaced from said side walls to constitute therewith spaced gaps, a channel shaped post secured to and intermediately of said rim vertically across said opening and comprising a vertically disposed web having spaced rearwardly extending and vertically arranged wings, said flange means and wings embodying horizontally aligned notches intermediately thereof, a channel shaped reach comprising a horizontally arranged web and rearwardly projecting and vertically spaced and horizontally disposed wings positioned within said notches for dividing said opening, lips depending from the ends and an intermediate part of said reach substantially in alignment with said horizontally arranged web and disposed substantially contiguous to said rim and to said vertically disposed web, upstanding lugs at the ends and an intermediate part of said reach and disposed substantially parallel to said flange means and vertically arranged wings and disposed within said gaps and also between said vertically arranged wings, and means securing said lugs to said flange means and to said vertically arranged wings.

ANGELO RESTIVO.

REFERENCES CITED

The following references are of record in the file of this patent:

UNITED STATES PATENTS

| Number | Name | Date |
|---|---|---|
| 1,476,798 | Clark | Dec. 11, 1923 |
| 1,569,158 | Tobey | Jan. 12, 1926 |
| 2,176,913 | Mandel | Oct. 24, 1939 |
| 2,192,862 | Eagley | Mar. 5, 1940 |
| 2,438,257 | Stevenson et al. | Mar. 23, 1948 |
| 2,520,506 | Mankki | Aug. 29, 1950 |